United States Patent
Chung et al.

(10) Patent No.: US 8,224,389 B2
(45) Date of Patent: Jul. 17, 2012

(54) MOBILE TERMINAL AND CONTROLLING METHOD THEREOF

(75) Inventors: Jin Woo Chung, Seoul (KR); Ho Young Hwang, Yongin-si (KR); Hye Jin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 898 days.

(21) Appl. No.: 12/134,921

(22) Filed: Jun. 6, 2008

(65) Prior Publication Data
US 2009/0088217 A1    Apr. 2, 2009

(30) Foreign Application Priority Data
Oct. 1, 2007  (KR) .................. 10-2007-0098740

(51) Int. Cl.
*H04B 1/38* (2006.01)
*H04M 1/00* (2006.01)
*G06F 3/14* (2006.01)

(52) U.S. Cl. ............ 455/566; 455/575.4; 715/864
(58) Field of Classification Search ........ 455/575.4, 455/566; 715/864
See application file for complete search history.

(56) References Cited

U.S. PATENT DOCUMENTS

| | | | |
|---|---|---|---|
| 6,009,338 A * | 12/1999 | Iwata et al. | 455/575.4 |
| 6,748,249 B1 * | 6/2004 | Eromaki et al. | 455/575.4 |
| 6,934,518 B2 * | 8/2005 | Cheng | 455/90.3 |
| 7,239,900 B2 * | 7/2007 | Choi et al. | 455/575.3 |
| 7,437,179 B1 * | 10/2008 | Sharp | 455/550.1 |
| 7,493,151 B2 * | 2/2009 | Collins | 455/575.4 |
| 7,738,931 B2 * | 6/2010 | Nitanda | 455/575.4 |
| 2003/0120690 A1 * | 6/2003 | Schaeffer et al. | 707/500 |
| 2003/0125023 A1 * | 7/2003 | Fishler | 455/426 |
| 2003/0223622 A1 * | 12/2003 | Simon et al. | 382/118 |
| 2004/0171346 A1 * | 9/2004 | Lin | 455/3.05 |
| 2004/0176047 A1 * | 9/2004 | Trively | 455/90.3 |
| 2005/0124387 A1 * | 6/2005 | Ribeiro et al. | 455/566 |
| 2006/0176278 A1 * | 8/2006 | Mathews et al. | 345/168 |
| 2006/0270445 A1 * | 11/2006 | Miramontes | 455/550.1 |
| 2006/0287015 A1 * | 12/2006 | Dunko | 455/575.4 |
| 2007/0037618 A1 * | 2/2007 | Lee | 455/575.4 |
| 2007/0167187 A1 * | 7/2007 | Rezvani et al. | 455/550.1 |
| 2008/0222567 A1 * | 9/2008 | Thoresson | 715/823 |

FOREIGN PATENT DOCUMENTS
JP    2000010713 A  *  6/1998

* cited by examiner

*Primary Examiner* — Nathan Mitchell
(74) *Attorney, Agent, or Firm* — Birch, Stewart, Kolasch & Birch, LLP

(57) ABSTRACT

A device, computer program product and method of controlling a display on a mobile terminal including a first body, a second body connected to the first body, the method including displaying a first display, including one of a still image, a slide show, or a moving image, on the touchscreen when the mobile terminal is closed; and automatically overlaying a text box on the first display when the mobile terminal is opened.

8 Claims, 11 Drawing Sheets

MOBILE TERMINAL AND CONTROLLING METHOD THEREOF

CROSS REFERENCE TO RELATED APPLICATIONS

This application claims the benefit of the Korean Patent Application No. KR 10-2007-0098740, filed on Oct. 1, 2007, which is hereby incorporated by reference as if fully set forth herein.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for configuring a display screen to consider more user's facilitation.

2. Discussion of the Related Art

Generally, a mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Recently, various terminals are introduced to enable various commands to be inputted via a touch screen provided to the corresponding terminal.

So, it is necessary to discuss what kind of configuration of a display screen or touchscreen facilitates a user to input various command.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a terminal user is facilitated to input a specific command to the mobile terminal with a minimum effort in a manner of configuring a display screen by considering user's convenience more than that of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a first input unit including a touchpad disposed in a mutual layer structure with the display unit to enable the display unit to work as a touchscreen, a second input unit, and a control unit controlling a configuration of a touch input icon displayed on the touchscreen to vary in accordance with activation or deactivation of the second input unit while a menu function is executed.

In another aspect of the present invention, a mobile terminal includes a display unit, an input unit, and a control unit controlling a display direction of a screen of the display unit to be switched in accordance with activation or deactivation of the input unit.

In another aspect of the present invention, a mobile terminal includes a display unit, an input unit, and a control unit controlling a text input box to be generated on a screen of the display unit in accordance with activation of the input unit in the course of executing a multimedia associated function.

In a further aspect of the present invention, a method of controlling a mobile terminal, which includes a touchscreen and a real touchpad, includes a real keypad activating step of activating the real keypad and an icon configuration modifying step of if the real keypad is activated, modifying a configuration of a touch input icon displayed on the touchscreen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the following description, suffixes 'module', 'unit' and 'part' for elements are given to facilitate the preparation of this disclosure only. So, significant meanings or roles are not given to the suffixes themselves. Hence, it is understood that the 'module', 'unit' and 'part' can be used together.

Figure 1:
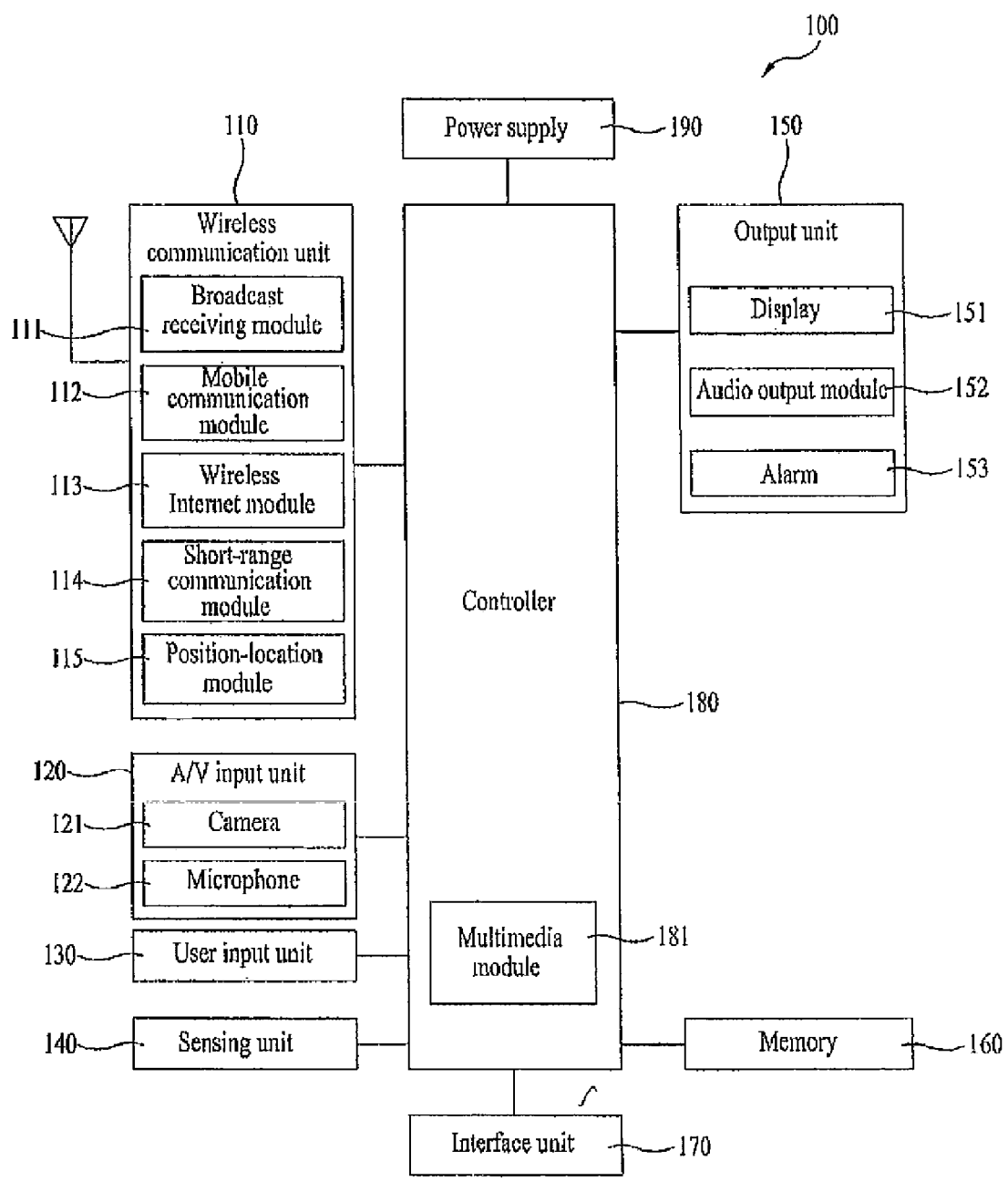
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile as well as non-mobile terminals, such as mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal. Suitable technologies for wireless internet may include, but are not limited to, WLAN (Wireless LAN) (Wi-Fi), Wibro (Wireless broadband), Wimax (World Interoperability for Microwave Access), HSDPA (High Speed Downlink Packet Access).

The short-range communication module 114 facilitates relatively short-range communications. Suitable technologies for short-range communication my include, but are not limited to, radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, instant message communication, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
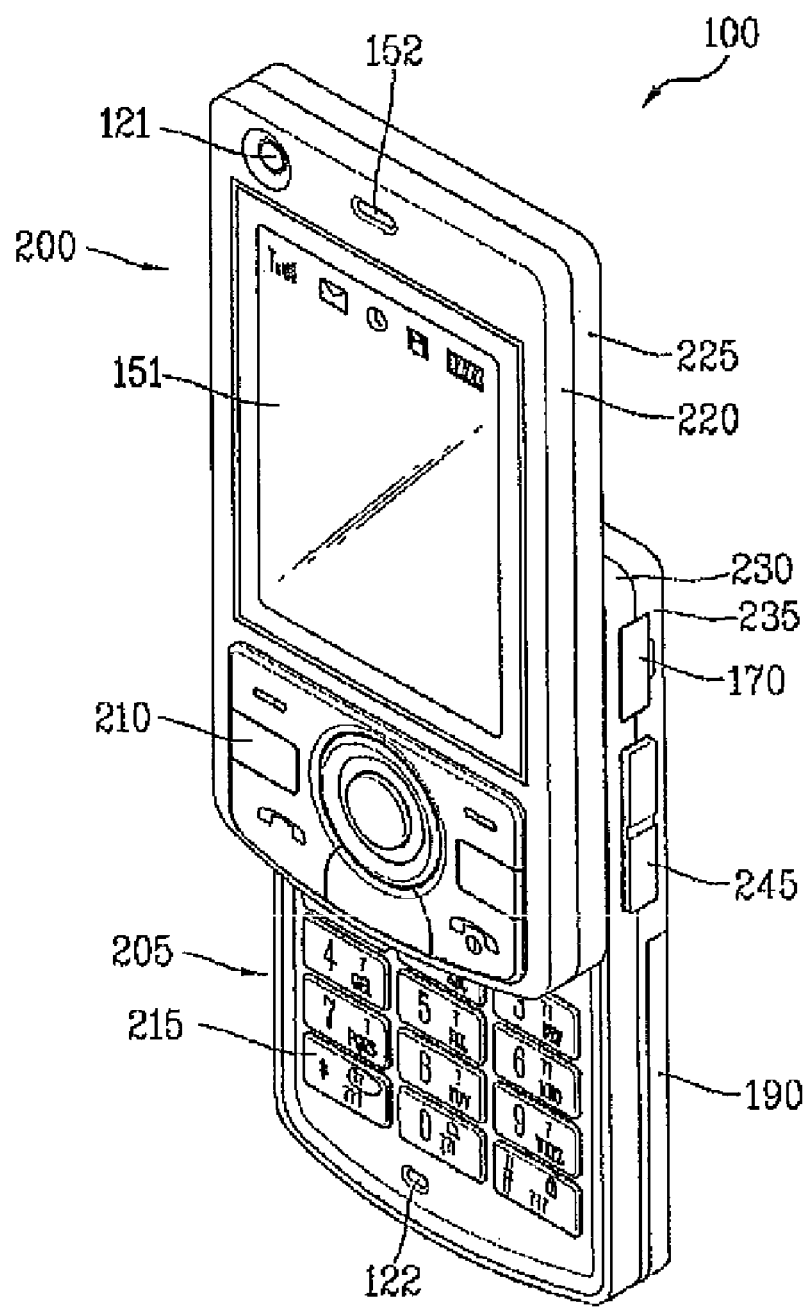
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) may include a first input unit such as the touchpad and function keys 210, a second input unit such as keypad 215 and a third input unit such as side keys 245. The function keys 210 are associated with first body 200, and the keypad 215 and the side keys 245 are associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. Although not shown in drawings, in case of a folder-type mobile terminal, a first body thereof folds and unfolds relative to a second body thereof between open and closed positions. In addition, in case of a swing-type mobile terminal, a first body thereof swings relative to a second body thereof between open and closed positions.

In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and the side keys 245 positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
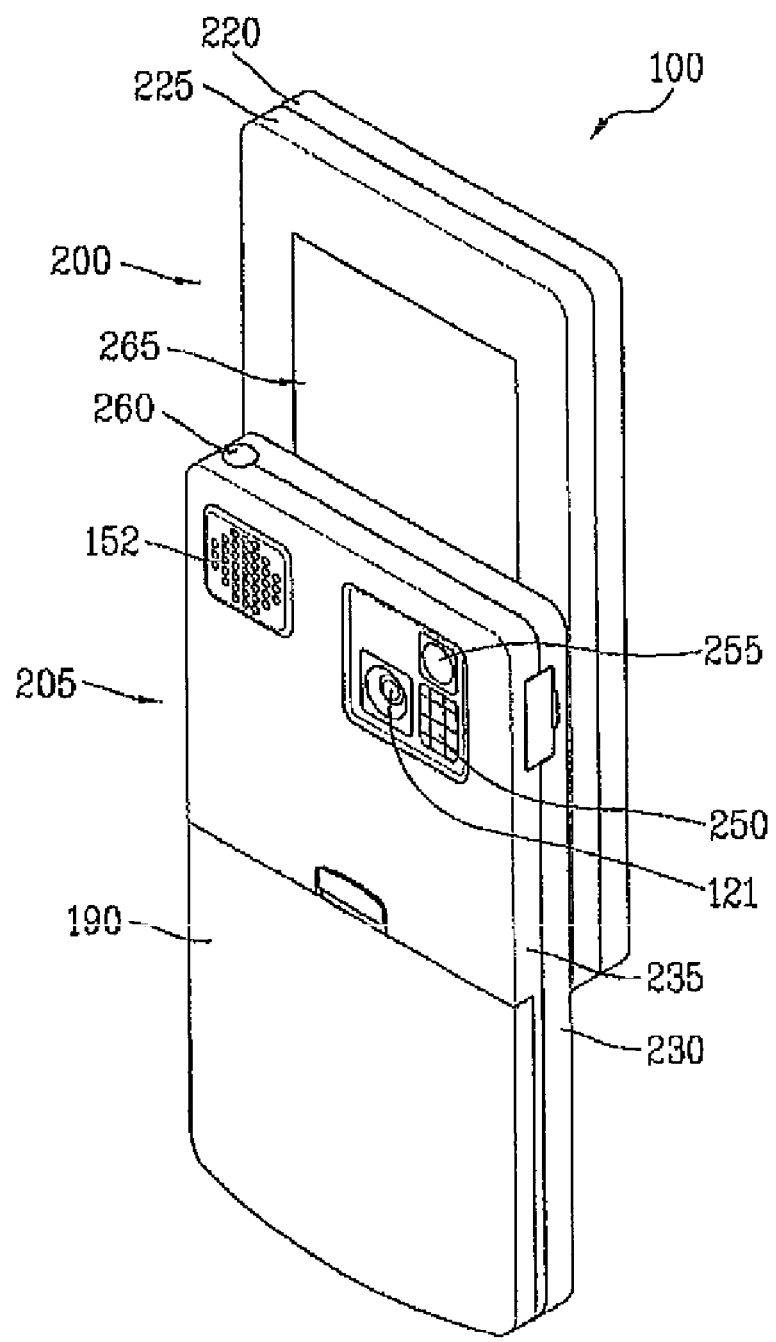
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
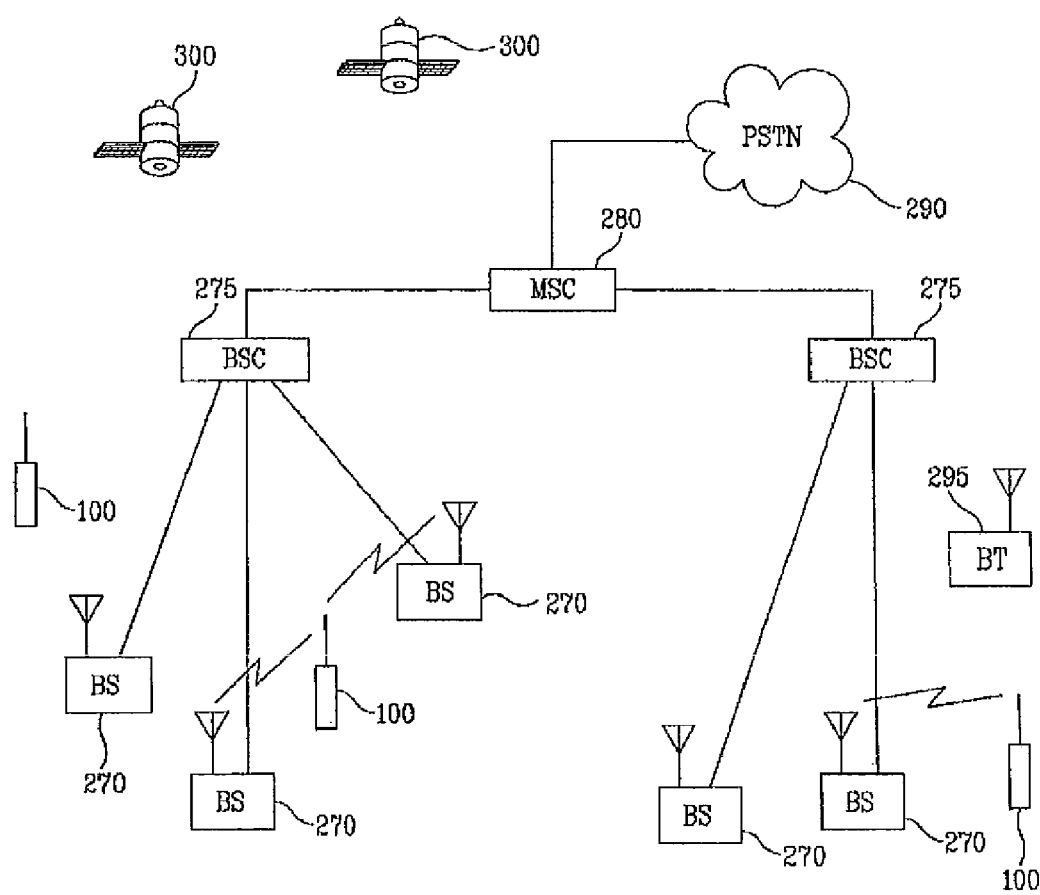
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

In the following description, a control method that can be implemented in the above-configured mobile terminal is explained with reference to the respective embodiments. It is understood that the following embodiments can be implemented independently or by being combined together.

And, the following description is made on the assumption that the mobile terminal is a slider type terminal shown in FIG. 1, FIG. 2 or FIG. 3, on the assumption that the second body 205 is a body, and on the assumption that first body 200 is a slider that slides on the body. It is understood that the present invention is applicable to various terminals in a folder type, a swing type and other types as well as to the slider type terminal.

First Embodiment

A method of controlling a mobile terminal according to a first embodiment of the present invention is explained with reference to FIG. 5 and FIGS. 6A and 6B as follows.

Figure 5:
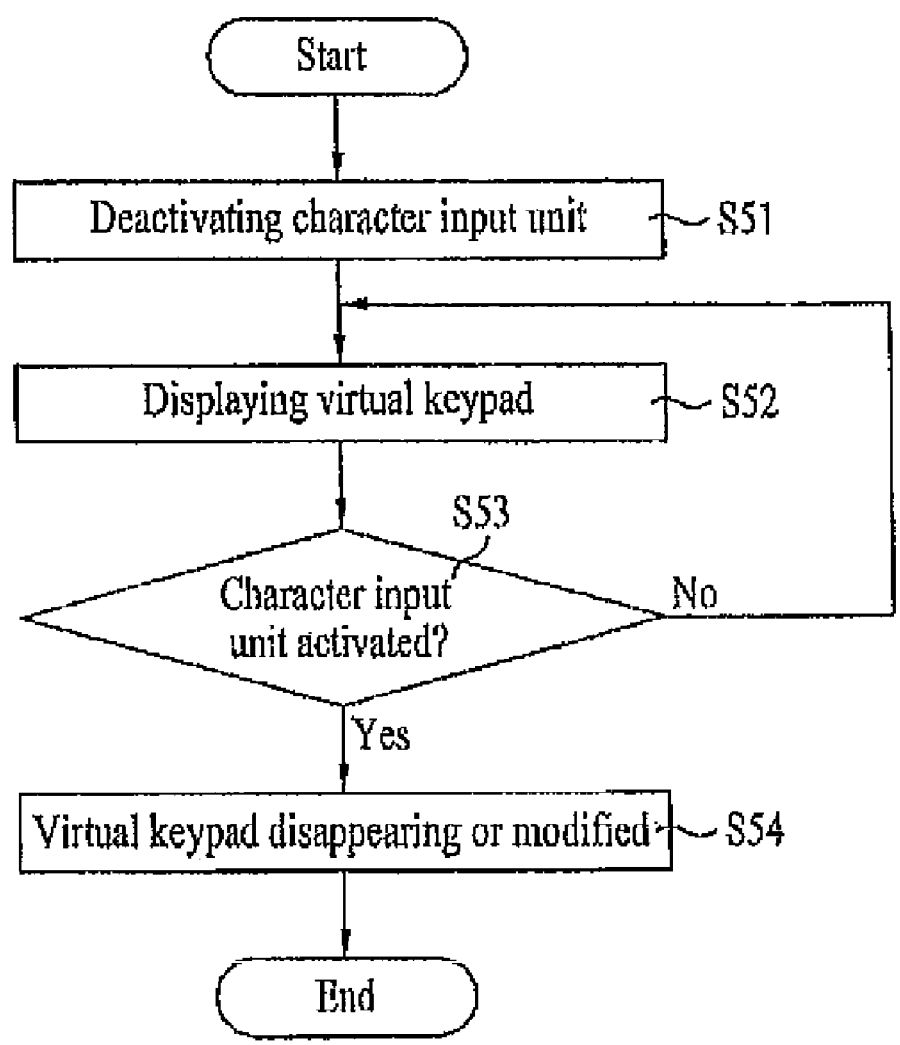
FIG. 5 is a flowchart for a method of controlling a mobile terminal according to a first embodiment of the present invention.
Figure 6A:
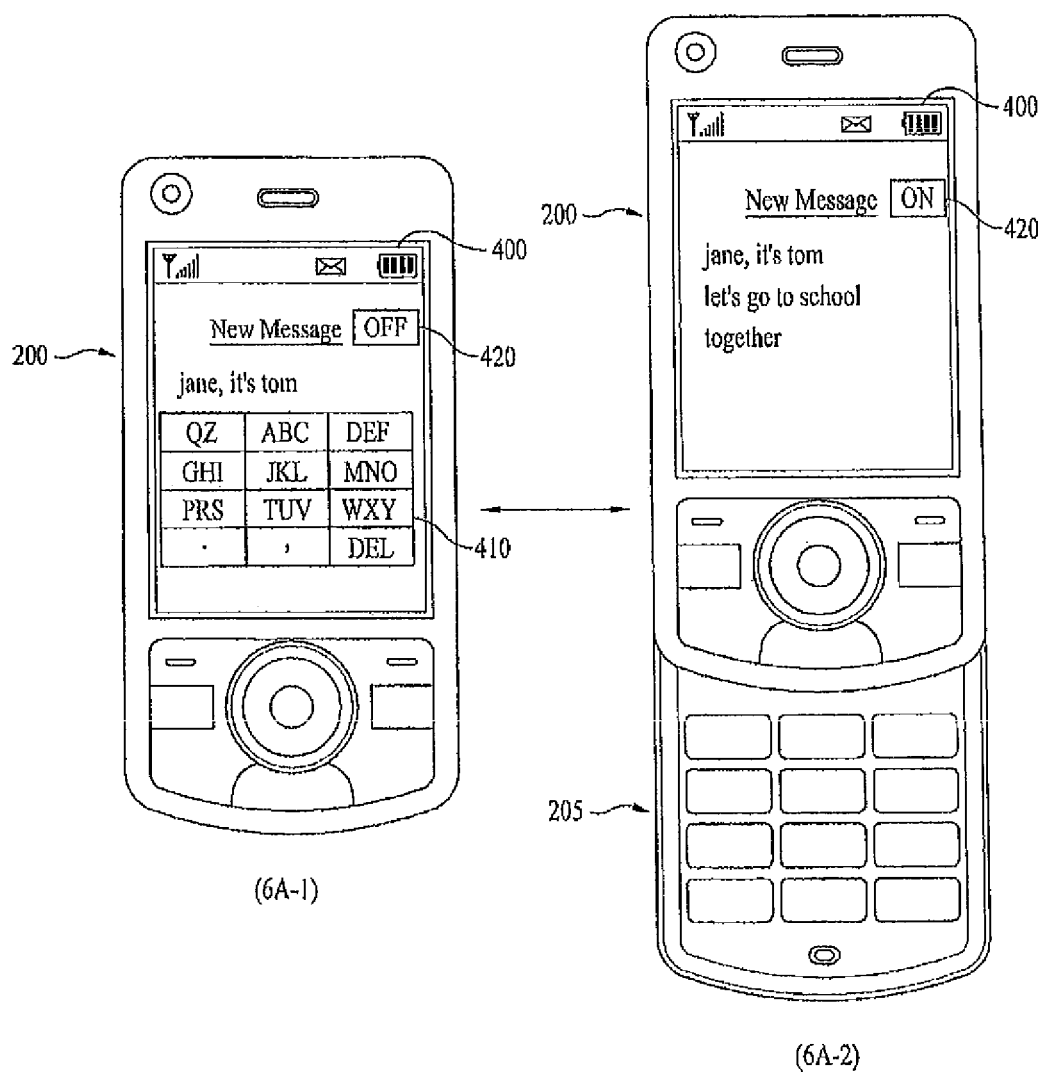
FIG. 6A and FIG. 6B are a diagram of a display screen on which a method of controlling a mobile terminal according to a first embodiment of the present invention is implemented.
Figure 6B:
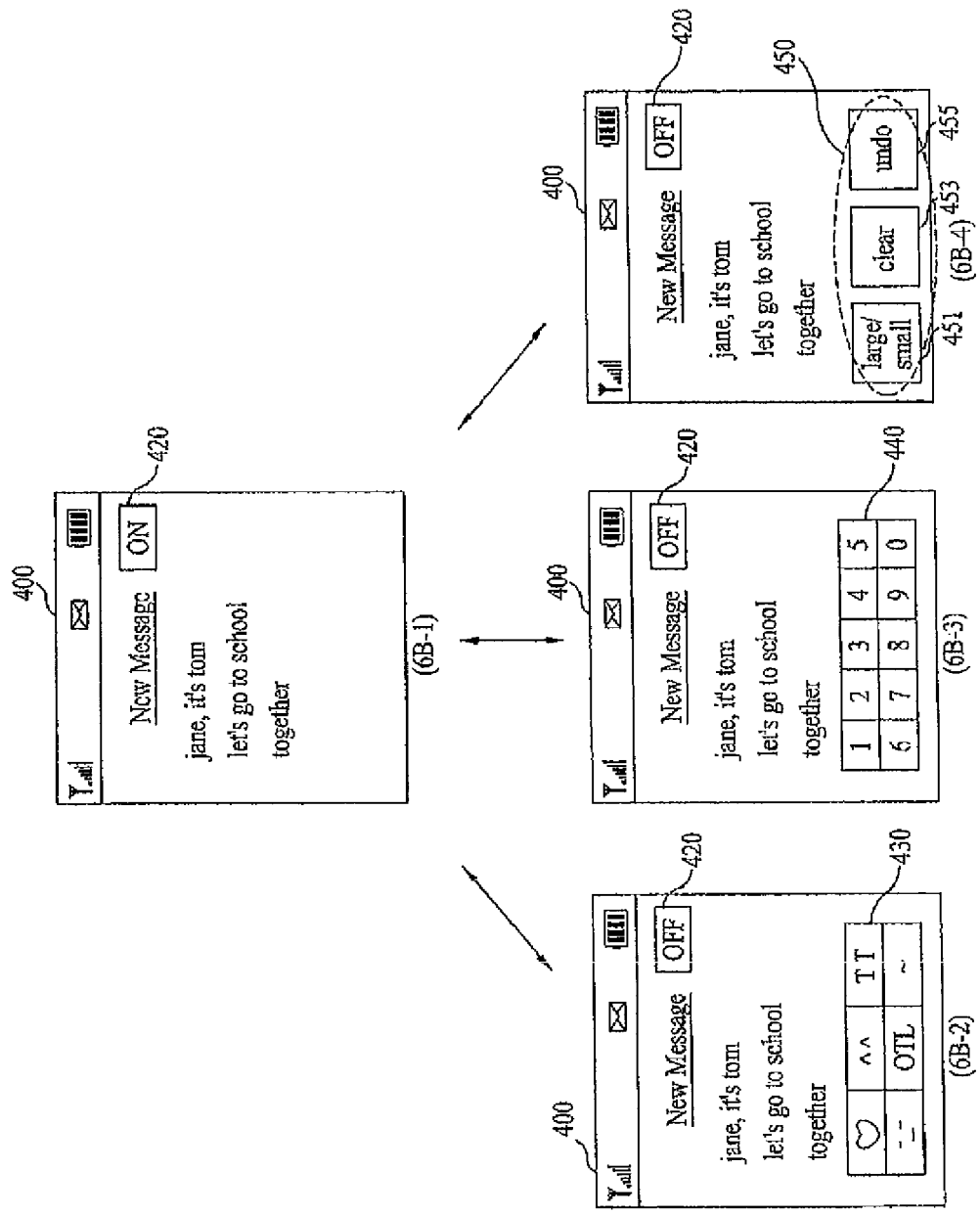

FIG. 5 is a flowchart for a method of controlling a mobile terminal according to a first embodiment of the present invention, and FIGS. 6A and 6B are a diagram of a display screen on which a method of controlling a mobile terminal according to a first embodiment of the present invention is implemented.

In a first embodiment of the present invention, the display 151 of the mobile terminal 100 is a touchscreen 400 having a mutual layer structure.

Referring to (6A-1) of FIG. 6A, while a user input unit (hereinafter named 'character input unit') for inputting characters mainly (e.g., the second input unit 215 shown in FIG. 2) is in an inactive state due to the slider 200 that closes the body 205, a function for writing a message can be executed in the mobile terminal 100 [S51].

A semi-transparent virtual keypad 410 (a sort of a touch input icon) for writing the message is displayed on the touchscreen 400 [S52].

Besides, the present embodiment is applicable not only to the case that the function for writing the message but also to the case that any prescribed function (e.g., phonebook registration) where the virtual keypad 410 is being used in the mobile terminal 100.

There are at least two schemes for making the virtual keypad 410 disappear in the course of inputting characters using the virtual keypad 410.

If a specific icon 420 provided to the touchscreen 400 is touched or clicked, the virtual keypad 410 disappears. It is understood that a role of the specific icon 420 can be replaced by a key button provided to the input body (e.g., the second input body) as well.

Alternatively if the slider 200 slides out to open the body 205 so that the character input unit is activated, it is able to configure the virtual keypad 410 to disappear as shown in (6A-2) of FIG. 6A [S53, S54]. The activation of the character input unit by sliding the slider 200 can be regarded as a terminal user's intention to input characters via the character input unit instead of using the virtual keypad 410.

While the mobile terminal 100 is in the stage shown in (6A-2) of FIG. 6A, if the terminal user touches the specific icon 420 again or closes the slider, the virtual keypad reappears on the touchscreen again.

The virtual keypad re-appearing by touching the specific icon 420 may be the same virtual keypad 410 as shown in (6A-1) of FIG. 6A. However, the implementations of the present embodiment are not limited thereto, which hereinafter is explained referring to FIG. 6B.

For instance, when the specific icon 420 is touched, (e.g., FIG. 6B-1) while the character input unit of the mobile terminal 100 is still in an active state, characters can be input via the character input unit. However, in this situation, it may not be desirable to display the same virtual keypad 410 as shown in (6A-1) of FIG. 6A for inputting characters on the touchscreen 400.

Instead, for example, an emoticon virtual keypad 430 for listing various emoticons thereon to facilitate the message can be displayed as shown in (6B-2) of FIG. 6B. Hence, the terminal user is able to input characters for the message writing via the character input unit. If necessary, the terminal user is able to input emoticons via the emoticon virtual keypad 430 on the touchscreen 400.

Alternatively, a numeral virtual keypad 440 having Arabic numerals listed thereon can be displayed as shown in (6B-3) of FIG. 6B. Hence, the terminal user is able to input alphabet letters via the character input unit. If necessary, the terminal user is able to input numerals via the numeral virtual keypad 440 on the touchscreen 400.

In yet another option, a plurality of icons 450 for submenus for the message writing function can be displayed as shown in (6B-4) of FIG. 6B. For instance, a plurality of the icons 450 include a big/small letter selecting icon 451 for selecting a big or small letter input in inputting the alphabetic letters, a clear icon 453 for clearing the inputted letters or statement at a time, and an undo icon 455 to undo a recent user manipulation.

That is, (6B-2) to (6B-4) of FIG. 6B exemplarily show that the virtual keypads 430, 440 and 450 capable of expanding the function of the character input unit are displayed on the touchscreen separately from the character input unit. Hence, the terminal user is further facilitated to write the message. It is also possible to tab through the various options by a variety of methods, including repeatedly touching the icon 420.

While the virtual keypad 430/440/450 shown in (6B-2)/(6B-3)/(6B-4) of FIG. 6B is displayed, if the specific icon 420 on the touchscreen 400 is touched, the touchscreen 400 returns to the state shown in (6B-1) of FIG. 6B so that the virtual keypad 430/440/450 can disappear from the touchscreen 400.

Meanwhile, while the slider 200 is closed so that the character input unit is deactivated and the virtual keypad 410 is being displayed on the touchscreen 400 as shown in (6A-1) of FIG. 6A, it is unnecessary to configure the virtual keypad 410 to definitely disappear as shown in (6A-2) of FIG. 6A when the slider 200 is opened.

That is, when the character input unit is activated, it is able to directly enter one of the states shown in (6B-2) to (6B-4) of FIG. 6B with skipping the state shown in (6A-2) of FIG. 6A.

So, if the character input unit is activated, the virtual keypad for the character input shown in (6A-1) of FIG. 6A turns into one of the emoticon virtual keypad 430, the numeral virtual keypad 440 and the sub-menu icons 450 respectively shown in (6B-2) to (6B-4) of FIG. 6B [S54].

When the virtual keypad 430/440/450 according to (6B-2)/(6B-3)/(68-4) of FIG. 6B is displayed, if the character input unit is deactivated, it is able to configure the mobile terminal 100 to directly enter the state shown in (6A-1) of FIG. 6A. This means that the virtual keypad 430/440/450 according to (6B-2)/(6B-3)/(6B-4) of FIG. 6B is changed into the virtual keypad 410 for the character input according to (6A-1) of FIG. 6A.

Second Embodiment

A method of controlling a mobile terminal according to a second embodiment of the present invention is explained with reference to FIG. 7 and FIG. 8 as follows.

Figure 7:
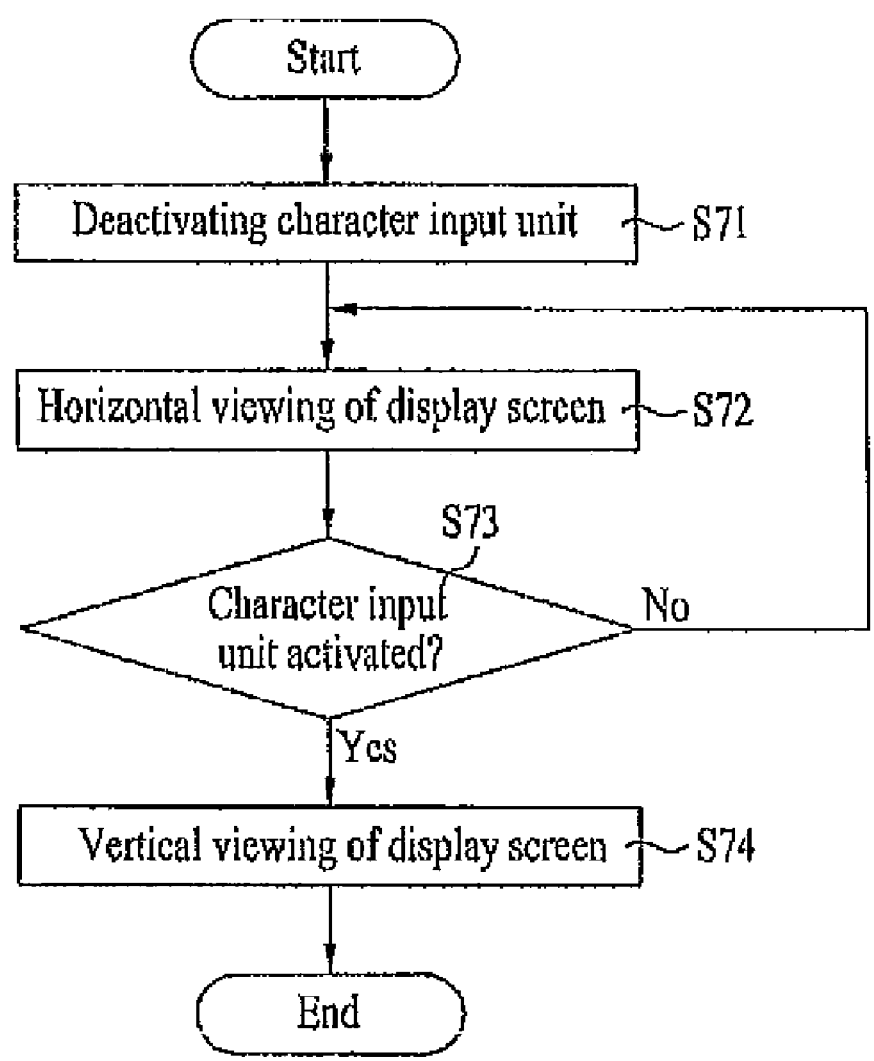
FIG. 7 is a flowchart for a method of controlling a mobile terminal according to a second embodiment of the present invention.
Figure 8:
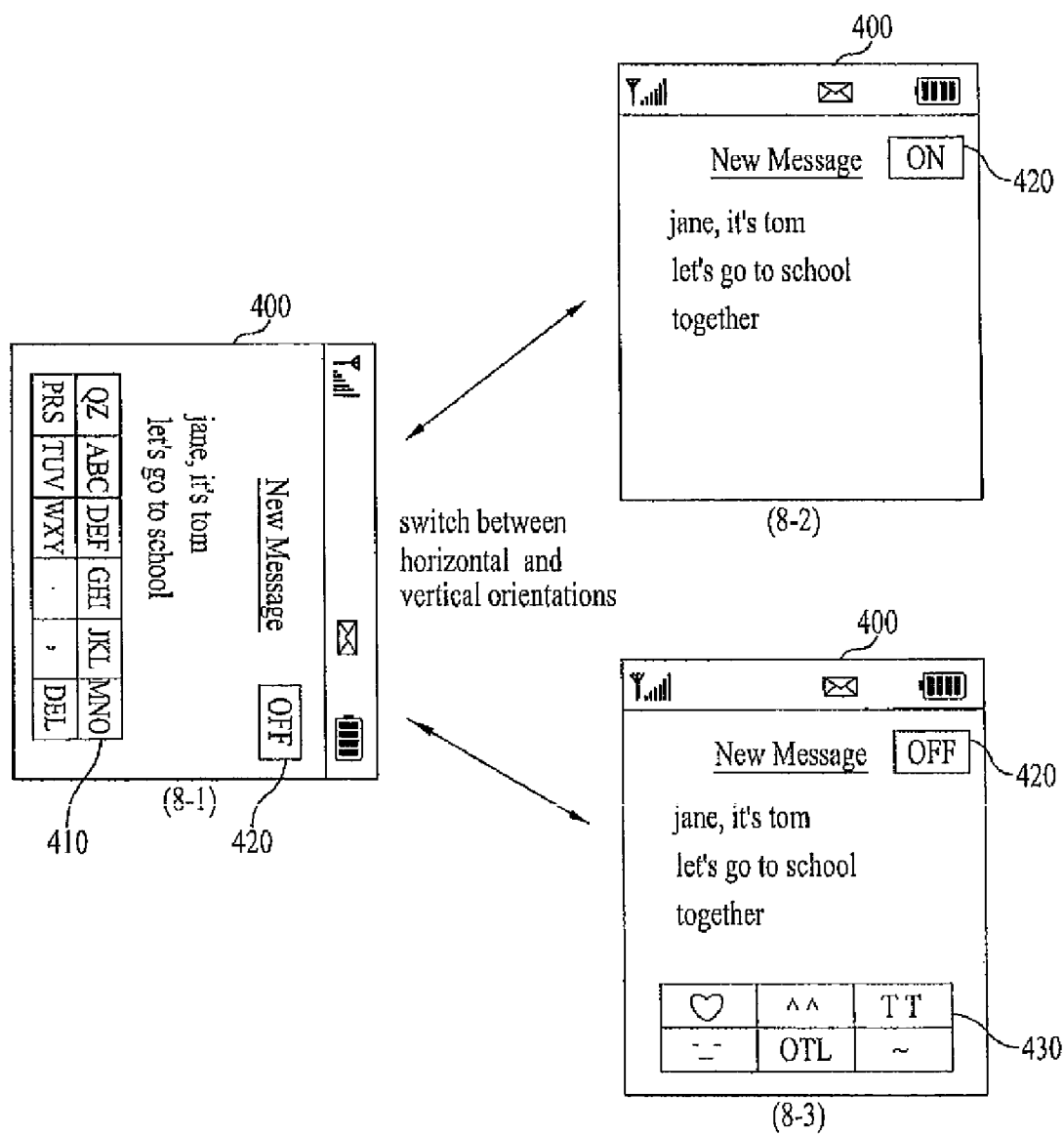
FIG. 8 is a diagram of a display screen on which a method of controlling a mobile terminal according to a second embodiment of the present invention is implemented.

FIG. 7 is a flowchart for a method of controlling a mobile terminal according to a second embodiment of the present invention, and FIG. 8 is a diagram of a display screen on which a method of controlling a mobile terminal according to a second embodiment of the present invention is implemented.

In a second embodiment of the present invention, like the first embodiment, the display 151 of the mobile terminal 100 is configured to work as a touchscreen by being arranged in a mutual layer structure with the touchpad.

Referring to (8-1) of FIG. 8, while the character input unit is deactivated, a message writing function may be executed in a horizontal view direction (where for example, a message is written parallel to a longitudinal side of the touchscreen) on the touchscreen [S71, S72]. For more details on the horizontal view direction, please refer to FIG. 2. When the mobile terminal of FIG. 2 becomes in a closed state and is turned by 90° counterclockwise, it is configured to facilitate a user to write a message parallel to a longitudinal side of the touch screen.

If a slider (i.e., the second body 205) of the mobile terminal 100 slides to set the mobile terminal 1000 in an open state, then the character input unit of the mobile terminal 100 becomes activated [S73].

Generally, the character input unit (e.g., the second input unit 215), as shown in FIG. 2, is configured to facilitate a character input when the mobile terminal is disposed in a vertical view direction (where for example, a message is written perpendicularly to a longitudinal side of the touchscreen).

So, if the character input unit is activated in the state shown in (8-1) of FIG. 8, a display direction of the touchscreen is switched to the vertical view direction to enable the message writing function to be executed on a vertical screen of the touchscreen as shown in (8-2) or (8-3) of FIG. 8 [S74].

Hence, the terminal user is more facilitated to input characters to the touchscreen via the character input unit.

The configuration of the touchscreen 400, as shown in (8-2) or (8-3) of FIG. 8, is described with reference to the first embodiment of the present invention, of which details will be omitted in the following description for clarity.

If the character input unit is deactivated, it is understood that the configuration of the touchscreen 400 returns to enter the state shown in (8-1) of FIG. 8.

Meanwhile, the display direction switching according to the present embodiment needs not to be limited to the case that the mobile terminal is executing the message writing function but also can be modified into the following cases. In the following modification, it is not mandatory for the display module to include the touchscreen.

For instance, while a broadcast reception playback or a multimedia contents playback is being executed suitable for a horizontal view direction on a display screen of the mobile terminal 100, then the mobile terminal becomes to be in an open state by sliding out the slider.

If so, the broadcast reception playback or the multimedia contents playback may be configured suitable for a vertical view direction on the display screen of the mobile terminal 100. If a terminal user forces the mobile terminal to enter the open state, the terminal user may attempt to use the second input unit.

Hence, if the display screen is configured in the vertical view direction, the terminal user is facilitated to manipulate the second input unit while viewing the splay screen.

This can be further extended to the case that a message is received from a correspondent party while the broadcast reception playback or the multimedia contents playback is being executed on the horizontal viewing screen. In this case, the received message is displayed in the horizontal viewing direction on the display screen. If the character input unit is activated to reply to the received message, the display screen is switched in the vertical view direction. Hence, the terminal user is facilitated to reply while viewing the display screen.

Third Embodiment

A method of controlling a mobile terminal according to a third embodiment of the present invention is explained with reference to FIG. 9 and FIG. 10 as follows.

Figure 9:
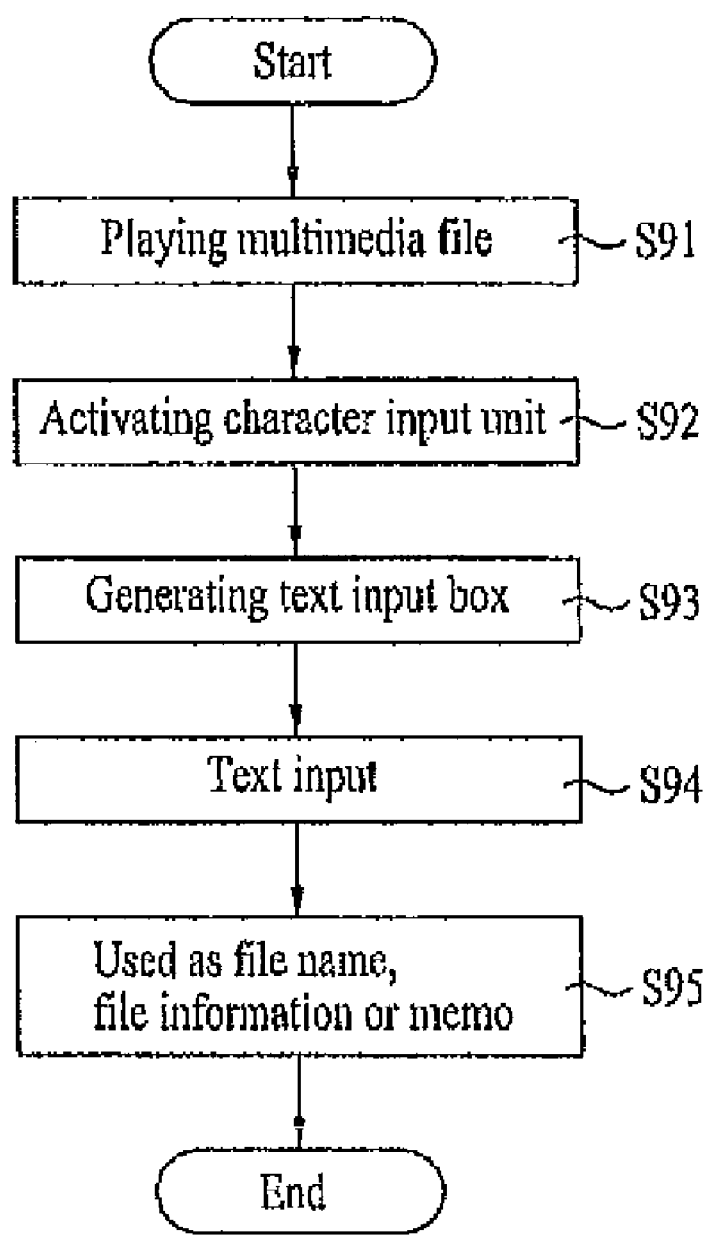
FIG. 9 is a flowchart for a method of controlling a mobile terminal according to a third embodiment of the present invention.
Figure 10:
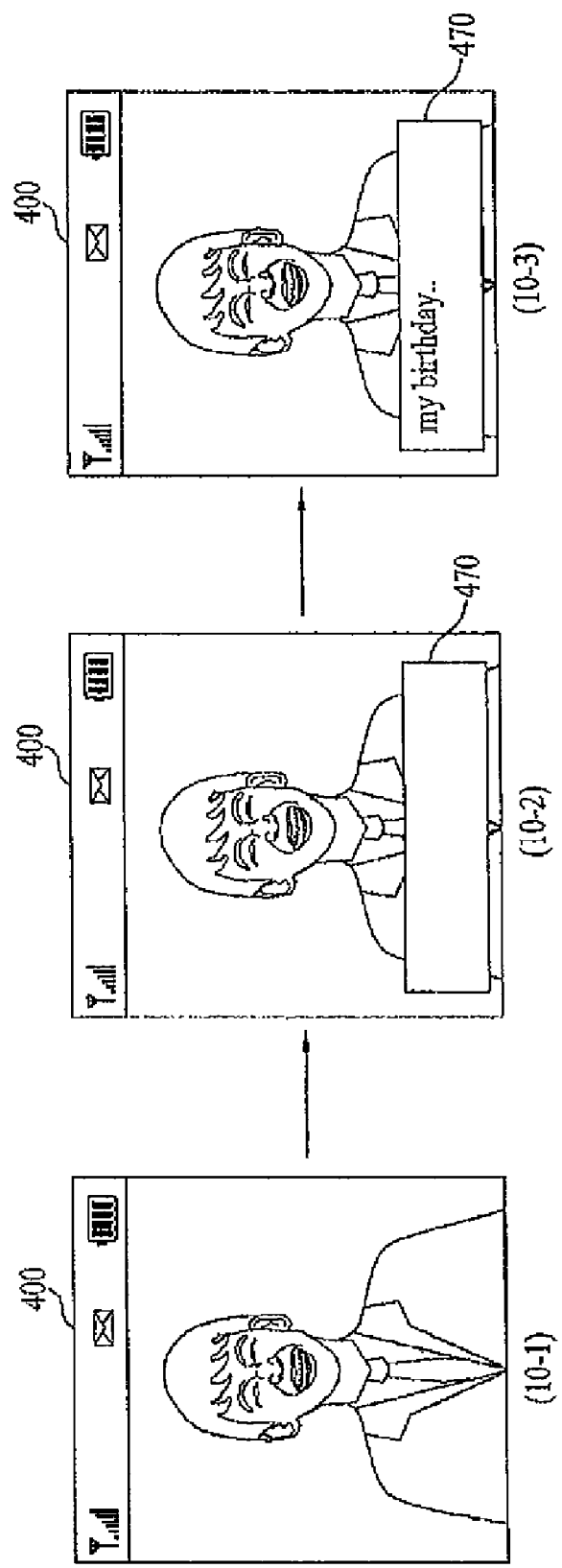
FIG. 10 is a diagram of a display screen on which a method of controlling a mobile terminal according to a third embodiment of the present invention is implemented.

FIG. 9 is a flowchart for a method of controlling a mobile terminal according to a third embodiment of the present invention, and FIG. 10 is a diagram of a display screen on which a method of controlling a mobile terminal according to a third embodiment of the present invention is implemented.

Referring to (10-1) of FIG. 10, a still or moving image file is displayed on the display screen 400 while the character input unit is deactivated [S91]. The present embodiment needs not to be limited to the case that the image file is played back in the mobile terminal 100. So, it is understood that the present embodiment is applicable to a case that one of different kinds of multimedia files (e.g., moving picture files, audio files, etc.) is played back. The multimedia file may also be a slide show.

Subsequently, when the character input unit is activated [S92], a character input box 470, a shown in (10-2) of FIG. 10, appears on the display screen 400 [S93]. If the image is a moving image, the moving image may or may not be stopped.

When text is inputted via the character input unit, the inputted text, as shown in (10-3) of FIG. 10, is displayed within the character input box 470.

If the character input unit is deactivated or if a separate manipulation is carried out via the character input unit, the character input box 470 disappears.

With this embodiment, the inputted text can be saved together with the image. And, the saved text can be used as a description or file name of the image. And, the inputted text is saved separate from the image to be used for a simple memo usage [S95]. If the image is a moving image which is stopped upon opening the terminal, the text entered in the text box may be tagged to a displayed frame or to the corresponding moving image file. If the image is a slide show, the text entered in the text box may be tagged to the displayed image.

Accordingly, the present invention provides the following effects or advantages.

First of all, a configuration of a touch icon such as a virtual keypad on a touchscreen varies in accordance with activation or deactivation of a character input unit.

Hence, a terminal user is able to input characters using the virtual keypad while the character input unit is deactivated. And, the terminal user is more facilitated in a manner of making the virtual keypad disappear or switch to a different keypad for another usage while the character input unit is activated.

Secondly, a screen view direction of a display screen is configured to be switched in accordance with activation or deactivation of a character input unit. For instance, while the character input unit is deactivated, the display screen lies in a horizontal view direction. If the character input unit is activated for inputting characters and the like, the display screen is automatically switched in a vertical view direction.

Hence, a terminal user is facilitated to manipulate a terminal via the character input unit while viewing the display screen.

Thirdly, if a character input unit is activated in the course of a reception or multimedia playback, a text input box for inputting characters is automatically generated.

Hence, a terminal user inputs a specific text in the text input box and then uses the inputted text as a file name, file information, a memo recording, and the like.

It will be apparent to those skilled in the art that various modifications and variations can be made in the present invention without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

Thus, it is intended that the present invention covers the modifications and variations of this invention provided they come within the scope of the appended claims and their equivalents.

What is claimed is:

1. A mobile terminal, comprising:
    a first body;
    a second body connected to the first body;
    a first input unit including a touchscreen, the first input unit on an outer surface of the first body;
    a second input unit on the second body, the first and second body configured to move relative to one another such that the second input unit is covered when the mobile terminal is closed, and the second input unit is exposed when the mobile terminal is open; and
    a controller configured to
        display a first display, including a first text field and a first keypad for entering data into the first text field, on the touchscreen when the mobile terminal is closed,
        automatically replace the first display on the touchscreen with a second display on the touchscreen when the mobile terminal is opened, the second display including a second text field related to the first text field, and without the first keypad,
        display a toggle switch as part of the second display, and
        display a second keypad on the touchscreen when the toggle switch is touched, the second keypad different from the first keypad.

2. The mobile terminal of claim 1, wherein the controller is configured to automatically rotate a display orientation of the touchscreen by 90 degrees when automatically replacing the first display on the touchscreen with the second display.

3. A mobile terminal, comprising:
    a first body;
    a second body connected to the first body;
    a first input unit including a touchscreen, the first input unit on an outer surface of the first body;
    a second input unit on the second body and having a second keypad, the first and second body configured to move relative to one another such that the second input unit is covered when the mobile terminal is closed, and the second input unit is exposed when the mobile terminal is open; and
    a controller configured to
        display a first display, including one of a still image, a slide show, or a moving image, on the touchscreen when the mobile terminal is closed, and
        automatically overlay a text box on the first display when the mobile terminal is opened, the text box configured to display text entered via the mobile terminal.

4. The mobile terminal of claim 3, wherein
    the second input unit comprises a keypad, and
    the controller is configured to
        display text entered via the keypad in the text box, and
        store the displayed text as a tag to the displayed one of a still image, a slide show, or a moving image.

5. A method of controlling a mobile terminal including a first body, a second body connected to the first body, a first input unit including a touchscreen, the first input unit on an outer surface of the first body, a second input unit on the second body, the first and second body configured to move relative to one another such that the second input unit is covered when the mobile terminal is closed, and the second input unit is exposed when the mobile terminal is open, the method comprising:
    displaying a first display, including a first text field and a first keypad for entering data into the first text field, on the touchscreen when the mobile terminal is closed;
    automatically replacing the first display on the touchscreen with a second display on the touchscreen when the mobile terminal is opened, the second display including a second text field related to the first text field, and without the first keypad;

displaying a toggle switch as part of the second display; and displaying a second keypad on the touchscreen when the toggle switch is touched, the second keypad different from the first keypad.

6. The method of claim 5, the step of automatically replacing comprising:

automatically rotating a display orientation of the touchscreen by 90 degrees.

7. A method of controlling a display on a mobile terminal including a first body, a second body connected to the first body, a first input unit including a touchscreen, the first input unit on an outer surface of the first body, and a second input unit on the second body, the first and second body configured to move relative to one another such that the second input unit is covered when the mobile terminal is closed, and the second input unit is exposed when the mobile terminal is open, the method comprising:

displaying a first display, including one of a still image, a slide show, or a moving image, on the touchscreen when the mobile terminal is closed; and automatically overlaying a text box on the first display when the mobile terminal is opened, the text box configured to display text entered via the mobile terminal.

8. The method of claim 7, wherein the second input unit comprises a keypad, the method further comprising:

displaying text entered via the keypad in the text box; and storing the displayed text as a tag to the displayed one of a still image, a slide show, or a moving image.

* * * * *